United States Patent
Huang et al.

(10) Patent No.: US 10,001,856 B2
(45) Date of Patent: Jun. 19, 2018

(54) DYNAMIC ENABLEMENT, DISABLEMENT AND ADJUSTMENT OF OFFSET OF A PERIODIC TIMING CONTROL SIGNAL

(71) Applicant: MediaTek Inc., Hsinchu (TW)

(72) Inventors: Po-Hua Huang, Hsinchu (TW); Hsueh-Bing Yen, Hsinchu (TW); Chiung-Fu Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 91 days.

(21) Appl. No.: 15/133,193

(22) Filed: Apr. 19, 2016

(65) Prior Publication Data
US 2016/0231863 A1 Aug. 11, 2016

Related U.S. Application Data

(60) Provisional application No. 62/151,056, filed on Apr. 22, 2015, provisional application No. 62/151,061, filed on Apr. 22, 2015.

(51) Int. Cl.
*G06F 3/041* (2006.01)
*G06F 1/20* (2006.01)
*G06F 1/32* (2006.01)
*G09G 5/18* (2006.01)

(52) U.S. Cl.
CPC ............ *G06F 3/0412* (2013.01); *G06F 1/206* (2013.01); *G06F 1/3206* (2013.01); *G06F 1/3262* (2013.01); *G06F 1/3265* (2013.01); *G09G 5/18* (2013.01); *G09G 2310/08* (2013.01); *Y02B 60/1242* (2013.01)

(58) Field of Classification Search
CPC .... G06F 3/0412; G06F 1/3265; G06F 1/3262; G06F 1/3206; G06F 1/206; G09G 5/18; G09G 2310/08
See application file for complete search history.

(56) References Cited

U.S. PATENT DOCUMENTS

2014/0123287 A1* 5/2014 Ahuja .................... G06F 21/00 726/23
2015/0355774 A1* 12/2015 Johansson ............ G06F 3/0416 345/173

* cited by examiner

*Primary Examiner* — Ilana Spar
*Assistant Examiner* — Brent D Castiaux
(74) *Attorney, Agent, or Firm* — Han IP Corporation; Andy M. Han

(57) ABSTRACT

Techniques pertaining to dynamic enablement, disablement and adjustment of offset of a virtual periodic timing control signal based on one or more predefined events are described. A method may determine whether a first predefined event is beginning. The method may also enable an offset of the virtual periodic timing control signal for synchronizing one or more first system modules in response to a determination that the first predefined event is beginning. The one or more first system modules may be configured to control one or more operations of one or more second system modules. The one or more second system modules may be configured to process one or more image frames. The method may further determine whether the first predefined event is ending. The method may additionally disable the offset in response to a determination that the first predefined event is ending.

20 Claims, 4 Drawing Sheets

DYNAMIC ENABLEMENT, DISABLEMENT AND ADJUSTMENT OF OFFSET OF A PERIODIC TIMING CONTROL SIGNAL

CROSS REFERENCE TO RELATED PATENT APPLICATIONS

The present disclosure claims the priority benefit of U.S. patent application Ser. No. 62/151,056, filed on 22 Apr. 2015, and U.S. patent application Ser. No. 62/151,061, filed on 22 Apr. 2015, each of which incorporated by reference in its entirety.

TECHNICAL FIELD

The present disclosure is generally related to periodic timing control signals for synchronization and, more particularly, to dynamic enablement, disablement and adjustment of offset of a periodic timing control signal based on one or more predefined events.

BACKGROUND

Unless otherwise indicated herein, approaches described in this section are not prior art to the claims listed below and are not admitted to be prior art by inclusion in this section.

In digital display systems, a periodic timing control signal such as the vertical synchronization signal (hereinafter interchangeably referred to as "$V_{Sync}$") is used to synchronize image frames to be displayed with a refresh rate of a display device of the display system. $V_{Sync}$ offset is a technique or feature in which a virtual periodic timing control signal (hereinafter interchangeably referred to as "virtual $V_{Sync}$"), which is normally synchronized and in phase with the periodic timing control signal, is offset to be out of phase with the periodic timing control signal so as to help reduce latency. For instance, an offset of virtual $V_{Sync}$ may be utilized as a reference so that, for each cycle of $V_{Sync}$, one or more system modules may start one or more processes (e.g., processes related to preparation of the image frames for display) some amount of time (e.g., the offset) earlier than the next instance of $V_{Sync}$. One benefit associated with the offset feature is better user experience in user interface such as, for example, response to and display of a touch and movement by a user on a touchscreen. Nevertheless, there are times in which having the offset feature enabled at all times may not be optimal to system performance or otherwise desired.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

The present disclosure provides techniques, schemes, methods and apparatus pertaining to dynamic enablement, disablement and adjustment of an offset of a virtual periodic timing control signal based on one or more predefined events. In one example implementation, a method may involve determining whether a first predefined event is beginning. The method may also involve enabling an offset of a virtual periodic timing control signal for synchronizing one or more first system modules in response to a determination that the first predefined event is beginning. The one or more first system modules may be configured to control one or more operations of one or more second system modules. The one or more second system modules may be configured to process one or more image frames and synchronized by a periodic timing control signal. The method may further involve determining whether the first predefined event is ending. The method may additionally involve disabling the offset in response to a determination that the first predefined event is ending.

In another example implementation, a method may involve determining whether a first predefined event is beginning. The method may also involve adjusting an amount of an offset of a virtual periodic timing control signal for synchronizing one or more first system modules in response to a determination that the first predefined event is beginning. The one or more first system modules may be configured to control one or more operations of one or more second system modules. The one or more second system modules may be configured to process one or more image frames and synchronized by a periodic timing control signal.

In yet another example implementation, an apparatus may include one or more first system modules, one or more second system modules, and a control logic. The one or more second system modules may be configured to process one or more image frames, and may be synchronized by a periodic timing control signal. The one or more first system modules may be configured to control one or more operations of the one or more second system modules. The control logic may determine whether a first predefined event is beginning. The control logic may also enable an offset of a virtual periodic timing control signal for synchronizing the one or more first system modules in response to a determination that the first predefined event is beginning. The control logic may further determine whether the first predefined event is ending, and disable the offset in response to a determination that the first predefined event is ending.

Advantageously, implementations in accordance with the present disclosure allow the offset to the virtual periodic timing control signal to be dynamically enabled, disabled and adjusted. For instance, the offset of the virtual periodic timing control signal may be dynamically adjusted according to system conditions at a given time and/or one or more predefined events including, for example and not limited to, start and ending of a user touching a touch sensing panel, activation and deactivation of thermal throttling and Wi-Fi display. Also advantageously, implementations in accordance with the present disclosure allow an amount of the offset to be dynamically adjusted. Techniques in accordance with the present disclosure may be applied not only in architectures involving a central processing unit (CPU) and its associated graphics processing unit (GPU) but also in architectures involving a CPU and its associated memory as well as in any other suitable hardware, architectures and implementations.

It shall be understood that, although implementations in accordance with the present disclosure may be utilized in the context of dynamic voltage and frequency scaling (DVFS), any other suitable applications may also benefit from the teachings of the present disclosure. Moreover, it shall be understood that, although implementations in accordance with the present disclosure may be described in the context of $V_{Sync}$, teachings of the present disclosure may be implemented in any other suitable applications.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION

Overview

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Figure 1:
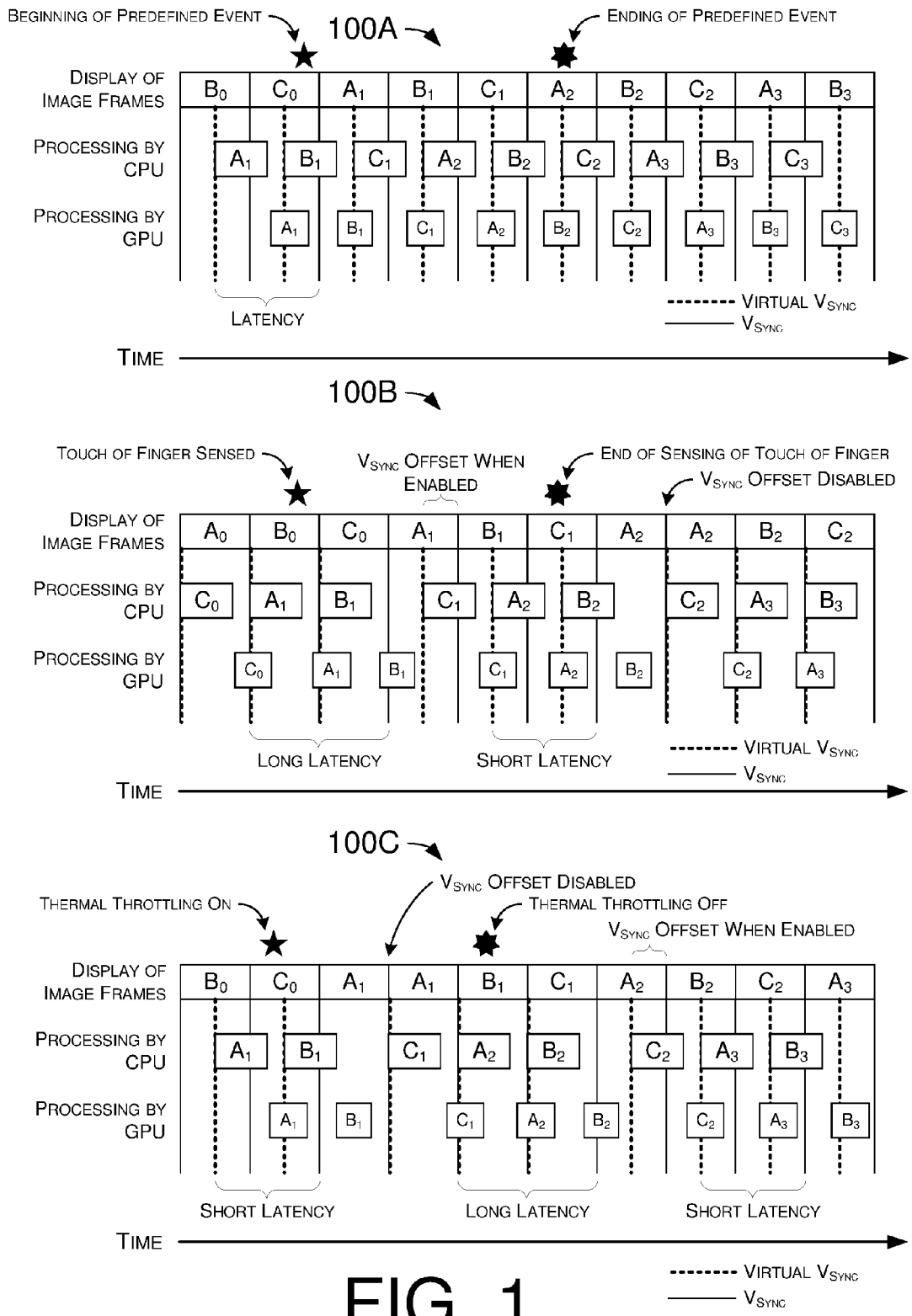
FIG. 1 is a diagram of example scenarios in accordance with implementations of the present disclosure.

FIG. 1 illustrates example scenarios in accordance with implementations of the present disclosure. Specifically, FIG. 1 shows a first example scenario 100A, a second example scenario 100B and a third example scenario 100C.

In scenario 100A a first example timing diagram is provided to illustrate a conventional approach according to which an amount of an offset of a virtual periodic timing control signal remains unchanged in the context of preparation of image frames for display. In scenario 100A, each of a CPU and a corresponding GPU may perform respective one or more processes to prepare a number of image frames, such as image frames $B_0, C_0, A_1, B_1, C_1, A_2, B_2, C_2, A_3$ and $B_3$, for display. The CPU begins its respective processing associated with each of image frames $B_0, C_0, A_1, B_1, C_1, A_2, B_2, C_2, A_3$ and $B_3$ according to a virtual periodic timing control signal (e.g., virtual $V_{Sync}$ or software-generated $V_{Sync}$). The GPU begins its respective processing associated with each of image frames $B_0, C_0, A_1, B_1, C_1, A_2, B_2, C_2, A_3$ and $B_3$ after the CPU finishes its respective processing. The display of each of image frames $B_0, C_0, A_1, B_1, C_1, A_2, B_2, C_2, A_3, B_3$ and $C_3$ is synchronized with a periodic timing control signal (e.g., $V_{Sync}$ or hardware-generated $V_{Sync}$). When offset of the virtual periodic timing control signal is disabled, the virtual periodic timing control signal is in phase with the periodic timing control signal. When offset of the virtual periodic timing control signal is enabled, the virtual periodic timing control signal is out of phase with the periodic timing control signal.

For simplicity, the following description of scenario 100A is directed to image frame $A_1$ although the same can be said regarding the other image frames. In scenario 100A, before image frame $A_1$ is displayed by a display device (shown in the top row of the timing diagram in scenario 100A), processing associated with image frame $A_1$ is first performed by the CPU and then by the GPU. That is, the processing associated with image frame $A_1$ needs to be completed by the CPU and GPU before image frame $A_1$ can be displayed. Put differently, image frame $A_1$ cannot be displayed unless the associated processing by the CPU and GPU is completed, and the GPU cannot begin its respective processing associated with image frame $A_1$ unless the CPU finishes its respective processing associated with image frame $A_1$. Accordingly, in scenario 100A, there is a latency of less than two clock cycles of the periodic timing control signal (e.g., less than 32 ms when each clock cycle is 16 ms) between the time the CPU begins its respective processing associated with image frame $A_1$ and the time image frame $A_1$ is displayed.

However, in scenario 100A, regardless whether a predefined event is beginning or ending, the amount of offset of the virtual periodic timing control signal remains unchanged. This may be undesirable. For instance, when the temperature of the CPU, GPU or one or more other hardware components rises to a threshold temperature, it may be desirable to activate thermal throttling of the CPU, GPU or one or more other hardware components (e.g., by limiting the maximum allowable operating frequency thereof) so as to control the respective temperature(s) not to exceed the threshold temperature. To that end, the offset of the virtual periodic timing control signal should be disabled (or, alternatively, the amount of the offset should be decreased) when thermal throttling is in effect. This is because the predefined event (e.g., thermal throttling) may have a higher priority than reaping the benefit of offsetting the virtual periodic timing control signal. In the context of thermal throttling, for example, controlling and lowering the system temperature, so as to ensure user safety and system performance, outweighs the ability to provide better user experience in user interface due to offset of the virtual periodic timing control signal.

In view of the above, understandably it would be beneficial to have the ability of dynamic adjustment (including dynamic enablement and disablement) of the offset of the virtual periodic timing control signal based on one or more predefined events. Accordingly, implementations in accordance with the present disclosure may dynamically enable the offset when there is a need and/or when enablement of offset would be desirable (e.g., to lower power consumption), and may dynamically disable the offset when the need for offset no longer exists and/or when disablement of offset would be desirable (e.g., to lower system temperature). Moreover, implementations in accordance with the present disclosure may dynamically adjust the amount of the offset (including setting the amount of the offset to a zero value to disable the offset and setting the amount of the offset to a non-zero value to enable the offset) depending on system conditions, system performance and/or the beginning and ending of one or more predefined events. Scenario 100B and scenario 100C illustrate two examples of dynamic enablement and disablement of the offset of the virtual periodic timing control signal.

In scenario 100B a second example timing diagram is provided to illustrate dynamic adjustment of an offset in the context of preparation of image frames for display. In scenario 100B, each of a CPU and a corresponding GPU may perform respective one or more processes to prepare a number of image frames, such as image frames $A_0$, $B_0$, $C_0$, $A_1$, $B_1$, $C_1$, $A_2$, $B_2$, $C_2$, $A_3$ and $B_3$, for display.

In scenario 100B the touching of a touchscreen of a user interface device by a user may be one of a number of predefined events based on which the offset of the virtual periodic timing control signal may be dynamically adjusted. As shown in FIG. 1, before the touching of the touchscreen begins, the amount of offset of the virtual periodic timing control signal (e.g., virtual $V_{Sync}$ or software-generated $V_{Sync}$) may be zero. In other words the offset may be disabled before touching of the touchscreen begins. During this time the latency may be relatively long (e.g., two clock cycles). Upon receiving an indication or otherwise detecting or determining that the touching of the touchscreen is beginning or has begun, the amount of offset of the virtual periodic timing control signal may be increased to a non-zero first value so as to enable the offset. When the offset is enabled, the latency may be shorter (e.g., less than two clock cycles). Subsequently, upon receiving an indication or otherwise detecting or determining that the touching of the touchscreen is ending or has ended, the amount of offset of the virtual periodic timing control signal may be decreased to zero or to a non-zero second value less than the non-zero first value. When the amount of the offset is decreased to zero, the offset of the virtual periodic timing control signal is effectively disabled. Accordingly, the offset of the virtual periodic timing control signal may be dynamically adjusted, enabled and disabled based on one or more predefined events which, in scenario 100B, may be the touching of a touchscreen of a user interface device by a user.

In scenario 100C a second example timing diagram is provided to illustrate dynamic adjustment of an offset in the context of preparation of image frames for display. In scenario 100C, each of a CPU and a corresponding GPU may perform respective one or more processes to prepare a number of image frames, such as image frames $B_0$, $C_0$, $A_1$, $B_1$, $C_1$, $A_2$, $B_2$, $C_2$, $A_3$ and $B_3$, for display.

In scenario 100C the activation and deactivation of thermal throttling may be one of a number of predefined events based on which the offset of the virtual periodic timing control signal may be dynamically adjusted. As shown in FIG. 1, before thermal throttling begins, the amount of offset of the virtual periodic timing control signal (e.g., virtual $V_{Sync}$ or software-generated $V_{Sync}$) may be at a non-zero first value. In other words the offset may be enabled before thermal throttling begins. During this time the latency may be relatively short (e.g., less than two clock cycles). Upon receiving an indication or otherwise detecting or determining that thermal throttling is beginning or has begun, the amount of offset of the virtual periodic timing control signal may be decreased to zero or a non-zero second value less than the non-zero first value. When the amount of offset is decreased to zero, the offset of the virtual periodic timing control signal is effectively disabled. When the offset is disabled, the latency may be relatively longer (e.g., two clock cycles). Subsequently, upon receiving an indication or otherwise detecting or determining that thermal throttling is ending or has ended, the amount of offset of the virtual periodic timing control signal may be increased to the non-zero first value or a non-zero third value different from the non-zero first value and greater than the non-zero second value. When the amount of the offset is increased to a non-zero value, the offset of the virtual periodic timing control signal is effectively enabled. Accordingly, the offset of the virtual periodic timing control signal may be dynamically adjusted, enabled and disabled based on one or more predefined events which, in scenario 100C, may be the activation and deactivation of thermal throttling.

Although not shown, another example predefined event may be Wi-Fi display which may involve a wireless transmission (e.g., in accordance with Wi-Fi) of a content, displayable at a first apparatus, from the first apparatus to a second apparatus to be displayed at the second apparatus. Similar to scenario 100C, before Wi-Fi display begins, the amount of offset of the virtual periodic timing control signal may be at a non-zero first value. In other words the offset may be enabled before Wi-Fi display begins. During this time the latency may be relatively short (e.g., less than two clock cycles). Upon receiving an indication or otherwise detecting or determining that Wi-Fi display is beginning or has begun, the amount of offset of the virtual periodic timing control signal may be decreased to zero or a non-zero second value less than the non-zero first value. When the amount of offset is decreased to zero, the offset of the virtual periodic timing control signal is effectively disabled. When the offset is disabled, the latency may be relatively longer (e.g., two clock cycles). Subsequently, upon receiving an indication or otherwise detecting or determining that Wi-Fi display is ending or has ended, the amount of offset of the virtual periodic timing control signal may be increased to the non-zero first value or a non-zero third value different from the non-zero first value and greater than the non-zero second value. When the amount of the offset is increased to a non-zero value, the offset of the virtual periodic timing control signal is effectively enabled. Accordingly, the offset of the virtual periodic timing control signal may be dynamically adjusted, enabled and disabled based on one or more predefined events which, in scenario 100C, may be the beginning and ending of Wi-Fi display.

Example Implementations

Figure 2:
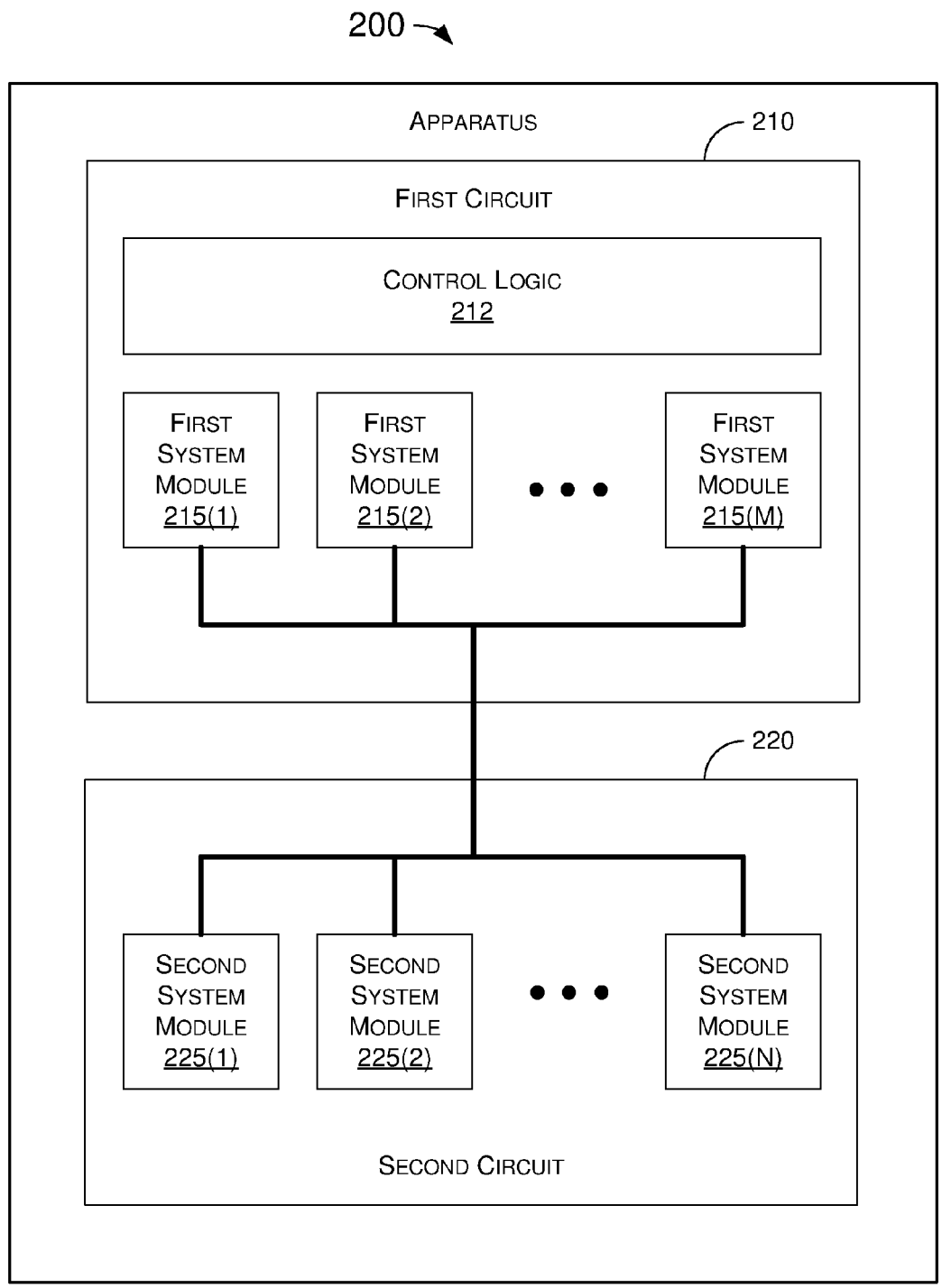
FIG. 2 is a simplified block diagram of an example apparatus in accordance with an implementations of the present disclosure.

FIG. 2 is a simplified block diagram of an example apparatus 200 in accordance with an implementation of the present disclosure. Apparatus 200 may perform various functions related to scenarios, techniques, schemes and methods described herein, including example scenarios 100B and 100C described above as well as example processes 300 and 400 described below.

In some implementations, apparatus 200 may be an electronic apparatus which may be, for example and not limited to, a smartphone, a smart wearable apparatus, a mobile or otherwise portable apparatus, an imaging apparatus, or a computing apparatus such as a tablet computer, a laptop computer, a notebook computer, a desktop computer or a server. In some implementations, apparatus 200 may be implemented in the form of one or more integrated-circuit (IC) chips such as, for example and not limited to, one or more single-core processors, one or more multi-core processors, or one or more complex-instruction-set-computing (CISC) processors.

Apparatus 200 may include at least those components shown in FIG. 2, such as a first circuit 210 and a second circuit 220. First circuit 210 may include a control logic 212 and one or more first system modules 215(1)-215(M) where M is a positive integer equal to or greater than 1. Each of the one or more first system modules 215(1)-215(M) may be a hardware module, a firmware module or a software module. Second circuit 220 may include one or more second system modules 225(1)-225(N) where N is a positive integer equal to or greater than 1. Each of the one or more second system modules 225(1)-225(M) may be a hardware module, a firmware module or a software module. In some implementations, first circuit 210 may include one or more CPUs and second circuit 220 may include one or more GPUs. In some implementations, first circuit 210 may include one or more CPUs and second circuit 220 may include one or more memory or storage devices. In some implementations, first circuit 210 and second circuit 220 may be physically in the same device or apparatus (e.g., apparatus 200 as shown in FIG. 2). Alternatively, first circuit 210 and second circuit 220 may be physically in separate devices or apparatuses (not shown). In any case, first circuit 210 and second circuit 220 may be communicatively or otherwise operatively coupled to each other with the one or more first system modules 215(1)-215(M) communicatively or otherwise operatively coupled to the one or more second system modules 225(1)-225(N).

Each of first circuit 210 and second circuit 220 may include one or more hardware modules, one or more software modules and/or one or more firmware modules. For instance, the one or more first system modules 215(1)-215(M) of first circuit 210 may include one or more hardware modules, one or more software modules and/or one or more firmware modules. Likewise, the one or more second system modules 225(1)-225(N) of second circuit 220 may include one or more hardware modules, one or more software modules and/or one or more firmware modules. Each hardware module may be in the form of one or more electronic circuits each respectively including physical elements such as one or more transistors, one or more diodes, one or more capacitors, one or more resistors, one or more inductors, one or more varactors and/or one or more memristors. Moreover, one or more of the hardware modules may be configured to execute one or more sets of instructions stored in the form of one or more firmware modules and/or one or more software modules. In some implementations, the one or more firmware modules and/or one or more software modules may be embedded or otherwise stored in one or more of the hardware modules (e.g., cache, register, buffer and/or memory) of apparatus 200. Additionally or alternatively, the one or more firmware modules and/or one or more software modules may be stored in one or more external memory or data storage devices.

In some implementations, the one or more first system modules 215(1)-215(M) of first circuit 210 may include one or more CPUs and associated firmware and/or software, and the one or more second system modules 225(1)-225(N) of second circuit 220 may include one or more GPUs. In some implementations, operations of the one or more first system modules 215(1)-215(M) may be synchronized with a virtual periodic timing control signal (e.g., virtual $V_{Sync}$ or software-generated $V_{Sync}$). The one or more first system modules 215(1)-215(M) may be configured to set, adjust or otherwise configure parameter(s) associated with the one or more second system modules 225(1)-225(N). Moreover, the one or more first system modules 215(1)-215(M) may be configured to control one or more operations of the one or more second system modules 225(1)-225(N).

In some implementations, control logic 212 may be configured to determine whether a first predefined event is beginning. Control logic 212 may be also configured to dynamically adjust an amount of an offset of a virtual periodic timing control signal for synchronizing the one or more first system modules 215(1)-215(M) in response to a determination that the first predefined event is beginning. In some implementations, control logic 212 may be configured to dynamically adjust the amount of the offset of the virtual periodic timing control signal when the offset is enabled. For example, the actual amount of time for the offset may be adjusted (e.g., increased or decreased) dynamically by control logic 212 in accordance with the beginning and/or ending of one or more predefined events, system condition(s) of apparatus 200 (e.g., loading, temperature of first circuit 210 and/or second circuit 220) and/or performance of one or more components of apparatus 200. That is, the duration of the offset may be a variable instead of a constant (e.g., 8 ms, 16 ms or else). Moreover, control logic 212 may increase or decrease the duration of the offset while offset is enabled. Control logic 212 may set or otherwise adjust the amount of offset to a zero value as a way to disable the offset, and control logic 212 may set or otherwise adjust the amount of offset to a non-zero value as a way to enable the offset.

In some implementations, control logic 212 may dynamically adjust the amount of offset while keeping the offset enabled. For instance, the amount of the offset may be a non-zero first value when the offset is first enabled. Subsequently, with the offset still enabled, control logic 212 may increase or decrease the amount of the offset to a non-zero second value different from the non-zero first value in response to change(s) in system conditions, system performance and/or the number of predefined events in effect. As an example, control logic 212 may dynamically enable offset of the virtual periodic timing control signal upon determining that a touch of a touchscreen is beginning and, accordingly, may increase the amount of offset from zero to a non-zero first value. Subsequently, with the offset still enabled, control logic 212 may determine that the temperature of one or more other hardware components (e.g., first circuit 210 and/or second circuit 220) has risen to a threshold temperature and, accordingly, may decrease the amount of the offset to a non-zero second value lower than the non-zero first value.

In some implementations, in dynamically adjusting the amount of the offset of the virtual periodic timing control signal, control logic 212 may be configured to perform a number of operations. For instance, control logic 212 may enable an offset of a virtual periodic timing control signal (e.g., virtual $V_{Sync}$ or software-generated $V_{Sync}$) for synchronizing the one or more first system modules 215(1)-215(M) in response to a determination that the first predefined event is beginning. Control logic 212 may also determine whether the first predefined event is ending and, in response to a determination that the first predefined event is ending, control logic 212 may disable the offset.

In some implementations, control logic 212 may be further configured to, when the offset is enabled, shift the virtual periodic timing control signal to an earlier time than when the offset is disabled. For example, referring to scenario 100B and scenario 100C in FIG. 1, when $V_{Sync}$ offset is enabled control logic 212 may shift the virtual $V_{Sync}$ to an earlier time than when $V_{Sync}$ offset is disabled.

In some implementations, the one or more first system modules 215(1)-215(M) may be synchronized by the virtual periodic timing control signal (e.g., virtual $V_{Sync}$ or software-generated $V_{Sync}$) to start generating setting data for a respective one of the one or more image frames at a time indicated by the virtual periodic timing control signal.

In some implementations, the beginning of the first predefined event may indicate a requirement for increasing a display speed of the one or more image frames. In some implementations, the ending of the first predefined event may indicate a requirement for decreasing system power consumption.

In some implementations, in the context of user interface for example, the first predefined event may include a touch of a touchscreen of a user interface device of an apparatus by a user. In some implementations, in determining whether the first predefined event is beginning, control logic 212 may be configured to determine whether the touchscreen begins to sense the touch by the user. Moreover, in determining whether the first predefined event is ending, control logic 212 may be configured to determine whether the touchscreen stops to sense the touch by the user.

In some implementations, in the context of thermal throttling for example, the first predefined event may include disabling of a thermal throttling event. In some implementations, in determining whether the first predefined event is beginning, control logic 212 may be configured to determine whether the thermal throttling event is disabled. Furthermore, in determining whether the first predefined event is ending, control logic 212 may be configured to determine whether the thermal throttling event is enabled.

In some implementations, in the context of Wi-Fi display for example, the first predefined event may include a wireless transmission of a content, displayable at a first apparatus (e.g., apparatus 200), from the first apparatus to a second apparatus (e.g., a remote or external apparatus relative to apparatus 200) to be displayed at the second apparatus. In some implementations, in determining whether the first predefined event is beginning, control logic 212 may be configured to determine whether the wireless transmission is disabled. Additionally, in determining whether the first predefined event is ending, control logic 212 may be configured to determine whether the wireless transmission is enabled.

In some implementations, the one or more first system modules 215(1)-215(M) may include one or more software modules running on one or more CPUs, and the one or more second system modules 225(1)-225(N) may include one or more GPUs. In some implementations, control logic 212 may be further configured to determine an operating frequency of the one or more GPUs in starting times of the virtual periodic timing control signal.

In some implementations, control logic 212 may be further configured to perform additional operations. For instance, control logic 212 may determine whether a second predefined event is beginning. Control logic 212 may also enable the offset of the virtual periodic timing control signal in response to a determination that the second predefined event is beginning. Control logic 212 may further determine whether the second predefined event is ending and, in response to a determination that the second predefined event is ending, disable the offset of the virtual periodic timing control signal.

In some implementations, an amount of the offset enabled in response to the beginning of the first predefined event may be different from an amount of the offset enabled in response to the beginning of the second predefined event. That is, control logic 212 may enable offsets at different amounts of time such that a first amount of offset time may be utilized corresponding to the first predefined event and a second amount of offset time may be utilized corresponding to the second predefined event, where the first amount of offset time and the second amount of offset time may be different.

In some implementations, control logic 212 may be further configured to increase an amount of the offset in response to a determination that at least the first and second predefined events are simultaneously occurring. That is, as more than one predefined event may be simultaneously occurring or otherwise in effect, control logic 212 may vary the amount of offset depending on the number of predefined events concurrently in effect at a given point of time. For example, control logic 212 may increase the amount of offset from zero to a non-zero first value when a first predefined event begins, and may increase the amount of offset from the non-zero first value to a non-zero second value higher than the non-zero first value when a second predefined event begins while the first predefined event is still in effect. Subsequently, when a third predefined event begins while both the first and second predefined events are still in effect, control logic 212 may further increase the amount of offset from the non-zero second value to a non-zero third value higher than the non-zero second value. Alternatively, when either the first or the second predefined event ends with the other predefined event remains in effect, control logic 212 may decrease the amount of offset from the non-zero second value to the non-zero first value or a non-zero fourth value lower than the non-zero second value.

In some implementations, the periodic timing control signal may include a vertical synchronization, or $V_{Sync}$, signal. In some implementations, a periodicity of the periodic timing control signal may be related to a refresh rate of a display device.

In some implementations, in dynamically adjusting the offset of the virtual periodic timing control signal, control logic 212 may be configured to perform a number of operations. For instance, control logic 212 may receive an indication that there is a need for adjustment of the offset of the virtual periodic timing control signal and, accordingly, control logic 212 may increase or decrease an amount of the offset of the virtual periodic timing control signal in response to receiving such indication. For instance, an operating system of apparatus 200 (not shown), control logic 212 or any of the one or more first system modules 215(1)-215(M) may determine that there is a touch sensing event associated with a touchscreen, a thermal throttling event to control the temperature of one or more components of apparatus 200 and/or a Wi-Fi display event, each of which may indicate a need for adjustment (including enabling and disabling) of the offset of the virtual periodic timing control signal.

In some implementations, in controlling the enabling and the disabling of the offset of the virtual periodic timing control signal, control logic 212 may be configured to perform a number of operations. For instance, control logic 212 may determine whether a first predefined event is beginning and, in response to a determination that the first predefined event is beginning, enable the offset of the virtual periodic timing control signal. Also, control logic 212 may determine whether the first predefined event is ending and, in response to a determination that the first predefined event is ending, disable the offset of the virtual periodic timing control signal.

In some implementations, in determining whether the first predefined event is beginning, control logic 212 may be configured to determine whether the touchscreen begins to sense the touch by the user. Moreover, in determining whether the first predefined event is ending, control logic 212 may be configured to determine whether the touchscreen stops to sense the touch by the user.

In some implementations, in dynamically adjusting the offset of the virtual periodic timing control signal, control logic 212 may be configured to perform a number of operations. For instance, control logic 212 may determine whether a second predefined event is beginning and, in response to a determination that the second predefined event is beginning, increase an amount of the offset of the virtual periodic timing control signal. Similarly, control logic 212 may determine whether the second predefined event is ending and, in response to a determination that the second predefined event is ending, decrease the amount of the offset of the virtual periodic timing control signal. In some implementations, the second predefined event may include, for example and not limited to, determining a thermal throttling associated with either or both of first circuit 210 and second circuit 220, one or more other electronic components, or a combination thereof.

Figure 3:
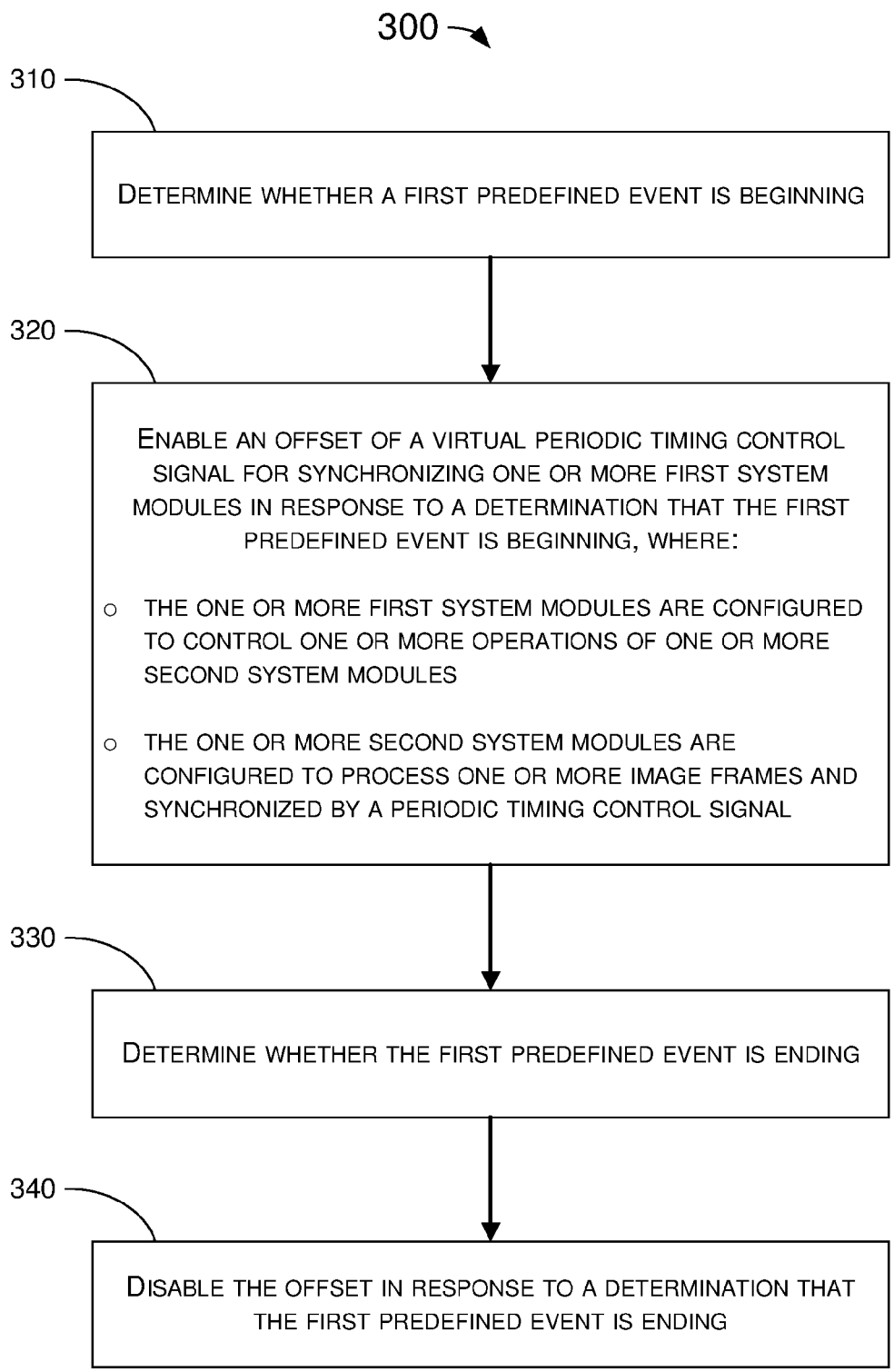
FIG. 3 is a flowchart of an example process in accordance with an implementation of the present disclosure.

FIG. 3 is a flowchart of an example process 300 in accordance with an implementation of the present disclosure. Process 300 may include one or more operations, actions, or functions as represented by one or more of blocks 310, 320, 330 and 340. Although illustrated as discrete blocks, various blocks of process 300 may be divided into additional blocks, combined into fewer blocks, or eliminated, depending on the desired implementation. The blocks of process 300 may be performed in the order shown in FIG. 3 or in any other order, depending on the desired implementation. Process 300 may be implemented by apparatus 200 and any variations and/or derivatives thereof. Solely for illustrative purposes and without limiting the scope, operations of process 300 are described below in the context of apparatus 200. Example process 300 may begin at block 310.

At 310, process 300 may involve control logic 212 of apparatus 200 determining whether a first predefined event is beginning. For example, control logic 212 may determine whether there is a requirement that a display speed of one or more image frames is to be increased. Process 300 may proceed from 310 to 320.

At 320, process 300 may involve control logic 212 of apparatus 200 enabling an offset of a virtual periodic timing control signal for synchronizing one or more first system modules 215(1)-215(M) in response to a determination that the first predefined event is beginning. The one or more first system modules 215(1)-215(M) may be configured to control one or more operations of one or more second system modules 225(1)-225(N), which may be configured to process the one or more image frames and may be synchronized by a periodic timing control signal. For instance, the virtual periodic timing control signal may be a virtual $V_{Sync}$ or software-generated $V_{Sync}$, and the periodic timing control signal may be a $V_{Sync}$ or hardware-generated $V_{Sync}$. In some implementations, a periodicity of the periodic timing control signal may be related to a refresh rate of a display device. Process 300 may proceed from 320 to 330.

At 330, process 300 may involve control logic 212 of apparatus 200 determining whether the first predefined event is ending. For example, control logic 212 may determine whether there is a requirement that the display speed of the one or more image frames is to be decreased. Process 300 may proceed from 330 to 340.

At 340, process 300 may involve control logic 212 of apparatus 200 disabling the offset in response to a determination that the first predefined event is ending.

In some implementations, when the offset is enabled, process 300 may also involve control logic 212 of apparatus 200 shifting the virtual periodic timing control signal to an earlier time than when the offset is disabled.

In some implementations, process 300 may also involve control logic 212 of apparatus 200 dynamically adjusting an amount of the offset of the virtual periodic timing control signal when the offset is enabled.

In some implementations, the first predefined event may include a touch of a touchscreen of a user interface device of an apparatus by a user. In some implementations, in determining whether the first predefined event is beginning, process 300 may involve control logic 212 of apparatus 200 determining whether the touchscreen begins to sense the touch by the user. Moreover, in determining whether the first predefined event is ending, process 300 may involve control logic 212 of apparatus 200 determining whether the touchscreen stops to sense the touch by the user.

In some implementations, the first predefined event may include disabling of a thermal throttling event. In some implementations, in determining whether the first predefined event is beginning, process 300 may involve control logic 212 of apparatus 200 determining whether the thermal throttling event is disabled. Furthermore, in determining whether the first predefined event is ending, process 300 may involve control logic 212 of apparatus 200 determining whether the thermal throttling event is enabled.

In some implementations, the first predefined event may include a wireless transmission of a content displayable at a first apparatus from the first apparatus to a second apparatus to be displayed at the second apparatus. In some implementations, in determining whether the first predefined event is beginning, process 300 may involve control logic 212 of apparatus 200 determining whether the wireless transmission is disabled. Additionally, in determining whether the first predefined event is ending, process 300 may involve control logic 212 of apparatus 200 determining whether the wireless transmission is enabled.

In some implementations, when the one or more second system modules include one or more GPUs, process 300 may also involve control logic 212 of apparatus 200 determining an operating frequency of the one or more GPUs in starting times of the virtual periodic timing control signal.

In some implementations, process 300 may further involve control logic 212 of apparatus 200 performing a number of operations. For instance, process 300 may involve control logic 212 determining whether a second predefined event is beginning. Process 300 may also involve control logic 212 enabling the offset of the virtual periodic timing control signal in response to a determination that the second predefined event is beginning. Process 300 may further involve control logic 212 determining whether the second predefined event is ending. Process 300 may additionally involve control logic 212 disabling the offset of the virtual periodic timing control signal in response to a determination that the second predefined event is ending. In some implementations, an amount of the offset enabled in response to the beginning of the first predefined event may be different from an amount of the offset enabled in response to the beginning of the second predefined event.

In some implementations, process 300 may also involve control logic 212 of apparatus 200 increasing an amount of the offset in response to a determination that at least the first and second predefined events are simultaneously occurring.

Figure 4:
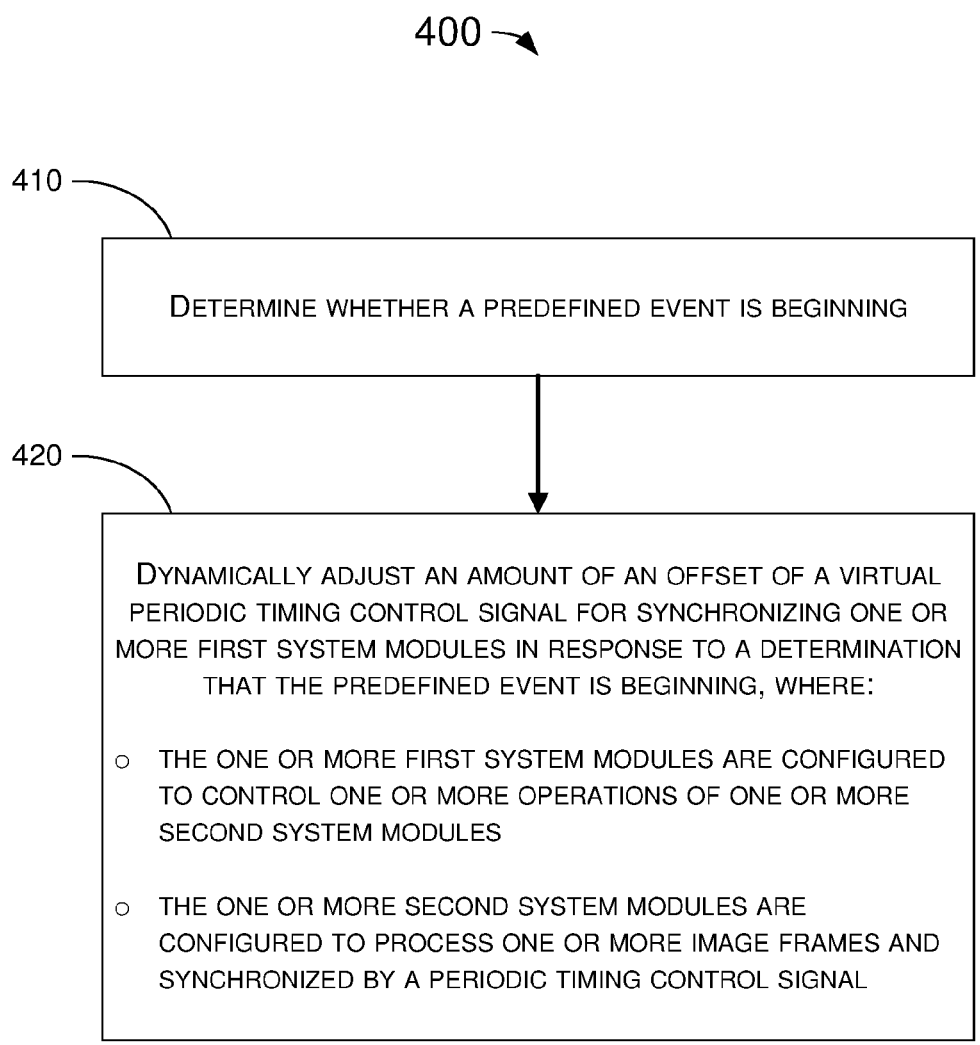
FIG. 4 is a flowchart of an example process in accordance with another implementation of the present disclosure.

FIG. 4 is a flowchart of an example process 400 in accordance with an implementation of the present disclosure. Process 400 may include one or more operations, actions, or functions as represented by one or more of blocks 410 and 420. Although illustrated as discrete blocks, various blocks of process 400 may be divided into additional blocks, combined into fewer blocks, or eliminated, depending on the desired implementation. The blocks of process 400 may be performed in the order shown in FIG. 4 or in any other order, depending on the desired implementation. Process 400 may be implemented by apparatus 200 and any variations and/or derivatives thereof. Solely for illustrative purposes and without limiting the scope, operations of process 400 are described below in the context of apparatus 200. Example process 400 may begin at block 410.

At 410, process 400 may involve control logic 212 of apparatus 200 determining whether a predefined event is beginning. For example, process 400 may also involve control logic 212 determining whether there is a requirement that a display speed of one or more image frames is to be increased, whether a touch of a touchscreen of a user interface device of an apparatus by a user is sensed, whether a thermal throttling event is disabled, or whether a wireless transmission of a content displayable at a first apparatus, from the first apparatus to a second apparatus to be displayed at the second apparatus, is to begin. Process 400 may proceed from 410 to 420.

At 420, process 400 may involve control logic 212 of apparatus 200 adjusting an amount of an offset of a virtual periodic timing control signal for synchronizing one or more first system modules in response to a determination that the first predefined event is beginning. The one or more first system modules may be configured to control one or more operations of one or more second system modules. The one or more second system modules may be configured to process one or more image frames and synchronized by a periodic timing control signal.

In some implementations, in dynamically adjusting the amount of the offset of the virtual periodic timing control signal, process 400 may involve control logic 212 performing a number of operations. For instance, process 400 may involve control logic 212 enabling the offset of the virtual periodic timing control signal for synchronizing the one or more first system modules in response to a determination that the predefined event is beginning. Process 400 may also involve control logic 212 determining whether the predefined event is ending and, in response to a determination that the predefined event is ending, disabling the offset.

In some implementations, the beginning of the predefined event may indicate a requirement for increasing a display speed of the one or more image frames, and the ending of the predefined event may indicate a requirement for decreasing system power consumption.

In some implementations, the predefined event may include a touch of a touchscreen of a user interface device of an apparatus by a user. Accordingly, in determining whether the predefined event is beginning, process 400 may involve control logic 212 determining whether the touchscreen begins to sense the touch by the user. Moreover, in determining whether the predefined event is ending, process 400 may involve control logic 212 determining whether the touchscreen stops to sense the touch by the user.

In some implementations, the predefined event may include disabling of a thermal throttling event. Accordingly, in determining whether the predefined event is beginning, process 400 may involve control logic 212 determining whether the thermal throttling event is disabled. Furthermore, in determining whether the predefined event is ending, process 400 may involve control logic 212 determining whether the thermal throttling event is enabled.

In some implementations, the predefined event may include a wireless transmission of a content displayable at a first apparatus from the first apparatus to a second apparatus to be displayed at the second apparatus. Accordingly, in determining whether the predefined event is beginning, process 400 may involve control logic 212 determining whether the wireless transmission is disabled. Additionally, in determining whether the predefined event is ending, in determining whether the predefined event is ending, process 400 may involve control logic 212 determining whether the wireless transmission is enabled.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining whether a first predefined event is beginning;
   enabling offset of a virtual periodic timing control signal to control operations of one or more second system modules of a second circuit by synchronizing one or more first system modules of a first circuit with the virtual periodic timing control signal in response to a determination that the first predefined event is beginning;
   dynamically adjusting the offset of the virtual periodic timing control signal;
   determining whether the first predefined event is ending; and
   disabling the offset of the virtual periodic timing control signal in response to a determination that the first predefined event is ending.

2. The method of claim 1, wherein the enabling of the offset of the virtual periodic timing control signal comprises enabling the offset of the virtual periodic timing control signal for a central processing unit (CPU) followed by a graphics processing unit (GPU) associated with the CPU.

3. The method of claim 2, wherein an operating frequency of the graphic processing unit (GPU) is determined in starting times of the virtual periodic timing control signal.

4. The method of claim 1, wherein the enabling of the offset of the virtual periodic timing control signal comprises enabling the offset of the virtual periodic timing control signal such that a time gap between a first offset periodic timing control signal and a previous periodic timing control signal is no less than a duration between two consecutive periodic timing control signals before the offset.

5. The method of claim 1, wherein the dynamically adjusting of the offset of the virtual periodic timing control signal comprises:
   receiving a signal from a module, the signal indicative of a need for adjustment of the offset of the virtual periodic timing control signal; and
   increasing or decreasing an amount of the offset of the virtual periodic timing control signal in response to the receiving of the signal.

6. The method of claim 1, wherein the dynamically adjusting of the offset of the virtual periodic timing control signal comprises:
   determining whether a second predefined event is beginning; and
   adjusting an amount of the offset of the virtual periodic timing control signal in response to a determination that the second predefined event is beginning.

7. The method of claim 6, wherein the dynamically adjusting of the offset of the virtual periodic timing control signal further comprises:
   determining whether the second predefined event is ending; and
   adjusting the amount of the offset of the virtual periodic timing control signal in response to a determination that the second predefined event is ending.

8. The method of claim 1, wherein the virtual periodic timing control signal comprises a vertical synchronization ($V_{Sync}$) signal.

9. An apparatus, comprising:
   a first circuit comprising one or more first system modules;
   a second circuit associated with the first circuit, the second circuit comprising one or more second system modules; and
   a control logic configured to control enabling and disabling of offset of a virtual periodic timing control signal utilized in the first circuit to control operations of the one or more second system modules of the second circuit by synchronizing the one or more first system modules of the first circuit with the virtual periodic timing control signal, the control logic further configured to dynamically adjust the offset of the virtual periodic timing control signal during a time when the offset of the virtual periodic timing control signal is enabled.

10. The apparatus of claim 9, wherein, in dynamically adjusting the offset of the virtual periodic timing control signal, the control logic is configured to perform operations comprising:
    receiving a signal indicative of a need for adjustment of the offset of the virtual periodic timing control signal; and
    increasing or decreasing an amount of the offset of the virtual periodic timing control signal in response to the receiving of the signal.

11. The apparatus of claim 9, wherein, in controlling the enabling and the disabling of the offset of the virtual periodic timing control signal, the control logic is configured to perform operations comprising:
    determining whether a first predefined event is beginning;
    enabling the offset of the virtual periodic timing control signal in response to a determination that the first predefined event is beginning;
    determining whether the first predefined event is ending; and
    disabling the offset of the virtual periodic timing control signal in response to a determination that the first predefined event is ending.

12. The apparatus of claim 11, wherein, in enabling the offset of the virtual periodic timing control signal, the control logic is configured to enable the offset of the virtual periodic timing control signal such that a time gap between a first offset periodic timing control signal and a previous periodic timing control signal is no less than a duration between two consecutive periodic timing control signals before the offset.

13. The apparatus of claim 11, further comprising:
    a user interface device comprising a touchscreen,
    wherein the first predefined event comprises sensing of a touch of the touchscreen of the user interface device by a user.

14. The apparatus of claim 13, wherein, in determining whether the first predefined event is beginning, the control logic is configured to determine whether the touchscreen begins to sense the touch by the user, and wherein, in determining whether the first predefined event is ending, the control logic is configured to determine whether the touchscreen stops to sense the touch by the user.

15. The apparatus of claim 11, wherein, in dynamically adjusting the offset of the virtual periodic timing control signal, the control logic is configured to perform operations comprising:
   determining whether a second predefined event is beginning;
   increasing an amount of the offset of the virtual periodic timing control signal in response to a determination that the second predefined event is beginning;
   determining whether the second predefined event is ending; and
   decreasing the amount of the offset of the virtual periodic timing control signal in response to a determination that the second predefined event is ending.

16. The apparatus of claim 15, wherein the second predefined event comprises determining a thermal throttling associated with either or both of the first circuit and the second circuit, one or more other electronic components, or a combination thereof.

17. The apparatus of claim 15, further comprising:
   a display device,
   wherein the second predefined event comprises a wireless transmission for a content displayable at the display device to another apparatus to be displayed at the another apparatus.

18. The apparatus of claim 9, wherein the virtual periodic timing control signal comprises a vertical synchronization ($V_{Sync}$) signal.

19. The apparatus of claim 9, wherein the first circuit comprises a central processing unit (CPU) and the second circuit comprises a graphics processing unit (GPU).

20. The apparatus of claim 19, wherein an operating frequency of the GPU is determined in starting times of the virtual periodic timing control signal.

* * * * *